A. HUETTER.
EXPANSIBLE CORE.
APPLICATION FILED APR. 26, 1921.
1,400,219.
Patented Dec. 13, 1921.
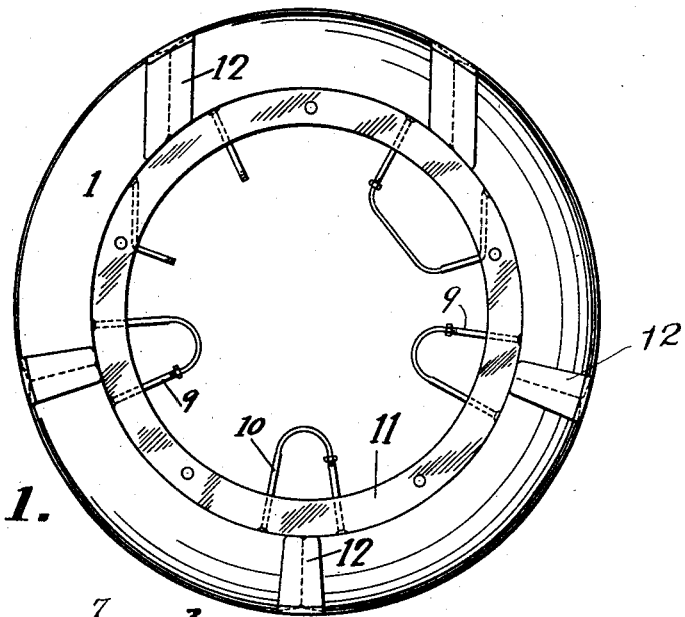
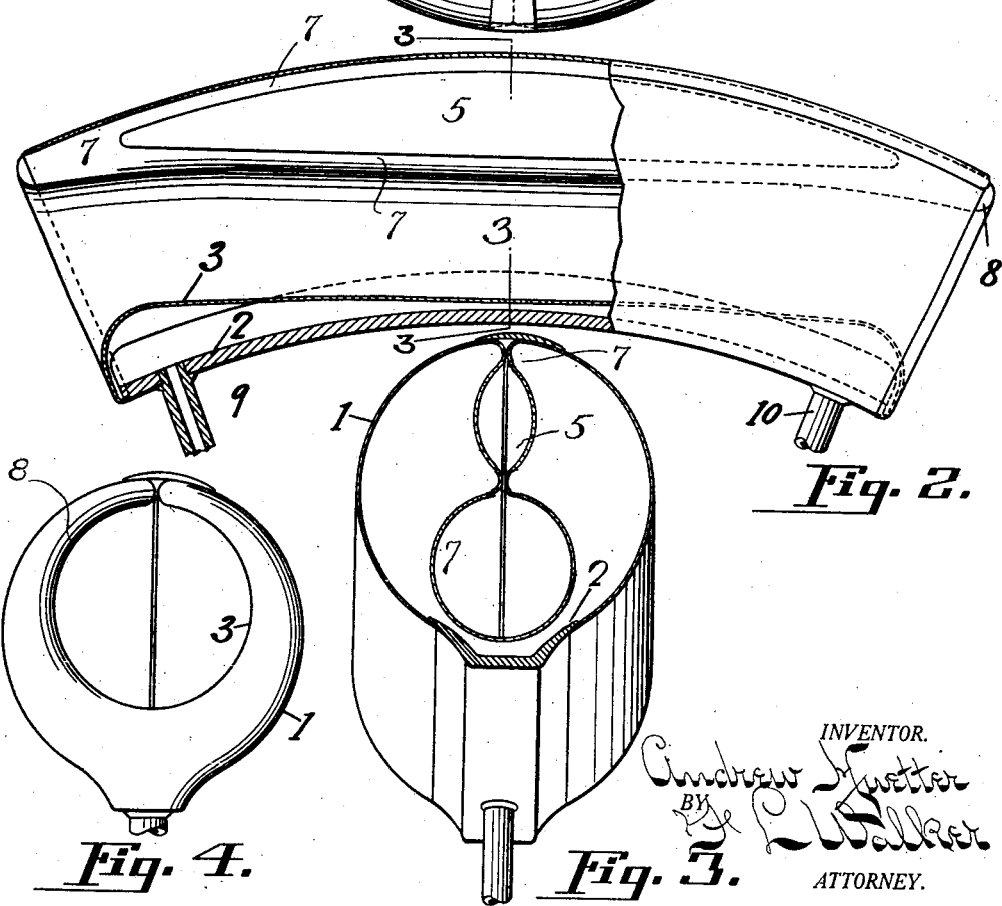
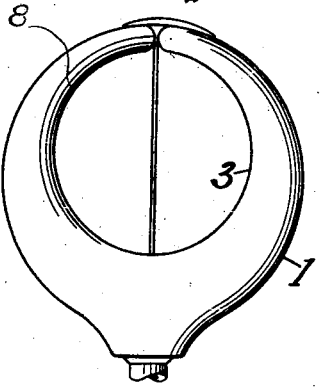
INVENTOR.
Andrew Huetter
BY L. Walker
ATTORNEY.

UNITED STATES PATENT OFFICE.

ANDREW HUETTER, OF DAYTON, OHIO.

EXPANSIBLE CORE.

1,400,219.  Specification of Letters Patent.  Patented Dec. 13, 1921.

Application filed April 26, 1921. Serial No. 464,671.

*To all whom it may concern:*

Be it known that I, ANDREW HUETTER, a subject of the former Emperor of Austria, residing at Dayton, in the county of Montgomery and State of Ohio, have invented certain new and useful Improvements in Expansible Cores, of which the following is a specification.

This invention relates to molds for plastic material, and more particularly to an expansible core or air bag for use in the manufacture and repair of pneumatic tires for vehicles and like articles.

The object of the invention is to simplify the structure as well as the means and mode of operation of such expansible cores whereby they will not only be cheapened in construction, but will be more efficient in use, positive in operation, uniform in action, of increased durability, and unlikely to get out of repair.

In the manufacture of vehicle tire casings and like articles, it is the practice to build the tire casing about a suitable core or mandrel and subsequently during the curing operation of the tire casing within the mold or matrix to subject the tire casing to internal pressure. The most general practice has been the use of elastic air bags made of fabric or rubber, or these materials in combination. However, the life or period of use of such elastic or expansible air bags has been quite short due to their deterioration under the heat of repeated vulcanizing operations. Under the influence of repeated heating they lose their elasticity and become hardened and set in form and therefore useless. For this reason, expansible metallic air bags or cores are to be preferred. To this end the present invention pertains to an expansible air bag or core made from flexible but inextensible sheet material, preferably but not necessarily metal. It is obvious that various compositions and substances possessing heat resistant characteristics capable of flexing action under pressure may be substituted for sheet metal. One of the primary objects of the present invention is to so arrange such core or segmental form as to effect uniform expansion throughout its length.

With the above primary and other incidental objects in view as will more fully appear in the specification, the invention consists of the features of construction, the parts and combinations thereof and the mode of operation or their equivalents as hereinafter described and set forth in the claims.

Referring to the drawings, Figure 1 is a side elevation of an assembled expansible core upon which the vehicle tire is built and later stretched during the vulcanizing operation. Fig. 2 is a side elevation of one of the segmental units, partly in section. Fig. 3 is a transverse sectional view of the segmental units on line 3—3 of Fig. 2. Fig. 4 is an end elevation.

Like parts are indicated by similar characters of reference throughout the several views.

As heretofore constructed, expanding tire cores of the character herein shown and described have depended for their elasticity upon expansion joints or reëntrant folds or plaits, having curvilinear form agreeing substantially with the curvature of the shell. While such shells have been found efficient and successful, in operation, there is a slight restraint or resistance to the opening or yielding movement of these expansion joints of curvilinear form, which is sought to be overcome in the present instance by making the expansion joint or fold substantially straight throughout its length and hence substantially equivalent to a chord in relation with the arcuate shell or core.

The expanding core units or sections forming the subject matter hereof comprise arcuate hollow shells 1, preferably provided at its inner circumference or concave face with a reinforced or thickened wall as at 2, forming a non-yielding or resistant inner side. The cross sectional contour of the unit conforms approximately to the interior outline of the tire casing to be produced. The segmental unit is formed from flexible but inextensible material preferably though not necessarily of sheet metal, but which in lieu thereof may be frictioned canvas, rubberized canvas, fiber, composition, hard rubber or other material, which possesses the necessary characteristics of being flexible and yielding under pressure, heat resistant and inextensible. The hollow shell 1 is provided with a tubular or substantially cylindrical passage 3 extending from one end to the other in a substantially straight line, or as nearly straight as is conveniently and practically possible. Theoretically, the inner side of this passageway should be straight. However, a reasonable degree of curvature will not necessarily destroy the function of the invention and any curvature less than that of the unit itself, will improve the resiliency and yielding flexibility of the device. The unit or shell is divided longitudinally from such longitudinal passage 3 outwardly to the exterior peripheral wall or convex side of the unit. This bifurcation of the shell forms in effect a reëntrant loop terminating at its inner extent in the substantially straight tubular passage 3, separating the hollow shell into two hollow compartments movable to and from each other under the influence of internal pressure, due to the flexibility of the reëntrant loop. The abutting faces of the reëntrant loop intermediate the longitudinal passage 3, and the circumferential face of the core are preferably indented or concaved as shown at 5. This concavity or indenture does not extend either to the exterior of the core nor into the passage 3, but there is left about such concave surface a marginal surface 7, which contacts with a like surface on the opposite side of the reëntrant fold or loop. The ends of the passage 3 are somewhat flared or curved outwardly merging easily into the exterior walls of the shell, as at 8. Each unit is provided with inlet and outlet connections 9 and 10, for fluid under pressure. This expanding fluid may be compressed air, steam, water or other medium. It is to be understood that the unit or core may be used singly for repair purposes, or may be assembled with others into a complete annulus as shown in Fig. 1 to serve as a core for building new tires. In such assembly, the core units or sections are placed end to end and are supported in assembled relation by means of supporting rings 11, concentric with and positioned within the annulus formed by the sections or units and engaging the fluid pressure inlet and outlet conduits 9 and 10. The several units are further interconnected by overlapping joint strips or leaves 12. Inasmuch as these joint strips or leaves and the supporting rings have been shown and described in my copending application, Serial No. 450,590, filed March 8, 1921, and in my issued Patent No. 1,368,631, issued February 15, 1921, they have not been here shown and described in detail. It is obvious that various other forms of joint connection and supporting means for the assembled units may be employed.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

Having thus described my invention I claim:

1. An expansible core for tires and the like comprising an arcuate hollow body of flexible but inextensible material having therein a reëntrant fold terminating in a tubular passage extending from end to end of the body in a substantially straight line and means for expanding said body.

2. An expansible core for tires and the like comprising a hollow arcuate body of flexible but inextensible material, and a substantially straight reëntrant fold therein, and means for expanding said body.

3. An expansible core for tires and the like comprising a hollow arcuate body of flexible but inextensible material, said body being longitudinally bifurcated, the said bifurcation terminating inwardly in a longitudinally disposed substantially straight passage, extending from end to end of the body and means for expanding said body.

4. An expansible core for tires and the like comprising a hollow arcuate body of flexible but inextensible material, a reëntrant fold therein, the opposite faces of the fold being concaved, such concavity being confined within the adjacent faces of the fold whereby the margins of the oppositely disposed concavities will approach into juxtaposition to each other, and means for bodily separating said concave faces.

5. An expansible core for tires and the like comprising a hollow arcuate body of flexible but inextensible material, a substantially straight expansion joint therein, and means for expanding said body.

6. An expansible core for tires and the like comprising a hollow arcuate body of flexible but inextensible material, having a substantially straight hinge like connection disposed as a chort of the arcuate body to permit the expansion thereof and means for expanding said body.

7. An expansible core for tires and the like comprising a hollow arcuate body of flexible but inextensible material, having means whereby when inflated its diameter will be increased, said means embodying a substantially straight flexible joint extending longitudinally of the body and means for expanding the body.

8. An expansible core for tires and the like comprising a hollow arcuate body of flexible but inextensible material, provided with a substantially straight groove or depression when contracted capable of distension in a transverse direction to increase the effective diameter of the body when expanded and means for expanding the body.

In testimony whereof, I have hereunto set my hand this 19th day of April, A. D. 1921.

ANDREW HUETTER.

Witnesses:
HANNAH M. CLINE,
GEORGE C. HELWIG.